United States Patent Office 3,673,022
Patented June 27, 1972

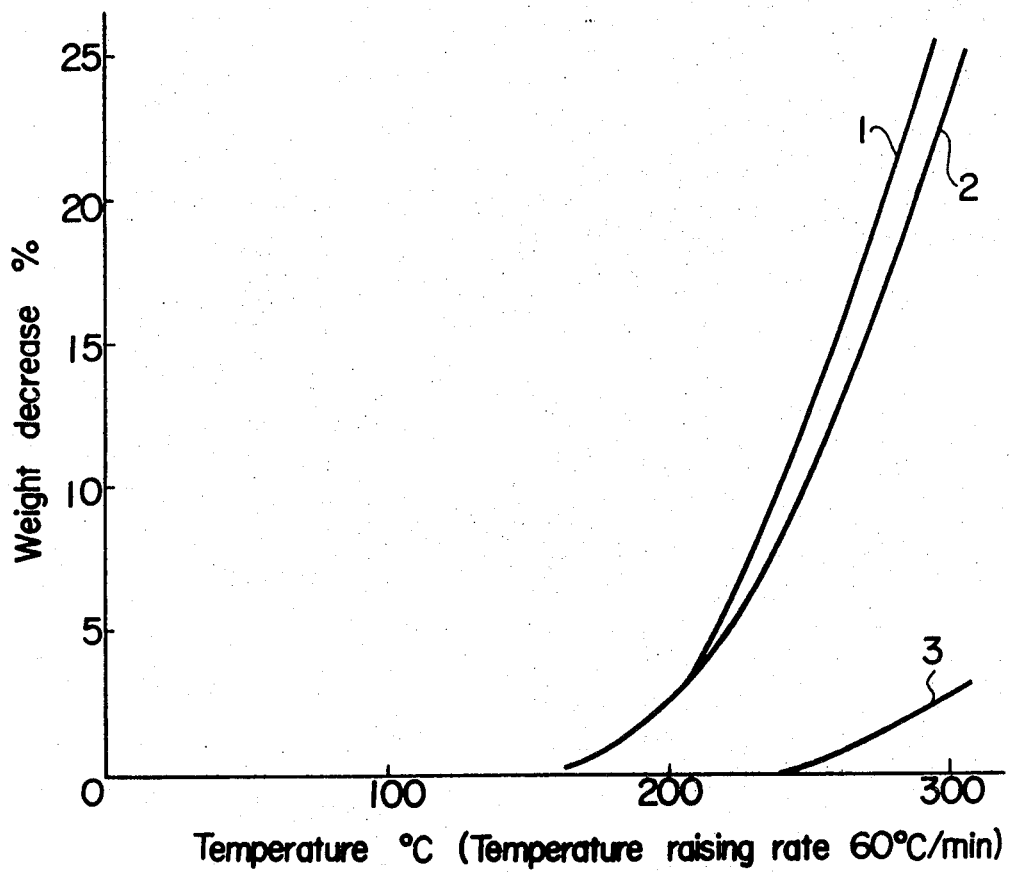

3,673,022
PROCESS FOR ADHERING A POLYESTER FIBROUS MATERIAL WITH A RUBBER
Ichiro Iwami, Toshio Honda, and Yukio Fukuura, Tokyo, Japan, assignors to Bridgestone Tire Company Limited, Tokyo, Japan
Filed May 27, 1969, Ser. No. 828,162
Claims priority, application Japan, June 4, 1968, 43/37,752
Int. Cl. B32b 25/02
U.S. Cl. 156—166               12 Claims

ABSTRACT OF THE DISCLOSURE

A strong adhesion of a polyester fibrous material and a rubber is obtained by using two baths for immersing the polyester fibrous material. The first bath is an aqueous solution of triglycidyl isocyanurate, which is a reaction product of isocyanuric acid and epichlorohydrin and this bath may be added with a second component of an amine, amine derivative, polybasic carboxylic acid or polybasic acid anhydride. The second bath is an aqueous solution of a resorcin-formaldehyde resin and a rubber latex solution. Namely the polyester fibrous material is immersed in the first bath and the immersed fibrous material is applied to a heat-treatment and then immersed in the second bath, thereafter applied to again a heat-treatment and the thus treated fibrous material is contacted with a vulcanizable rubber composition and the assembly is subjected to a vulcanization.

---

This invention relates to an improved process for adhering a synthetic fibrous material, particularly, a polyester fibrous material with a rubber.

The term "polyester fibers" used herein means linear high molecular weight polyesters, which contain ester linkage in the main chain and the molecule of which is highly oriented in the direction of fiber axis.

The polyesters include products obtained by reacting a glycol, such as ethylene glycol, propylene glycol, methoxypolyethylene glycol, pentaerythritol, etc., with a dicarboxylic acid, or a dicarboxylic acid ester, such as terephthalic acid, isophthalic acid, dimethyl terephthalate, dimethyl isophthalate, etc. The most typical fiber is polyethylene terephthalate fiber.

The fibrous materials mean reinforcing materials to be used for reinforcing rubber articles, such as, air tire, belt, air spring, rubber hose and the like and they are used in form of filament, cord cable, cord fabric, canvas and the like.

The rubbers include all natural rubber and synthetic rubbers, which are referred to as rubbery elastic polymers and particularly mean compositions of rubber blend of at least one of ordinarily used rubbers, such as natural rubber, styrene-butadiene copolymer rubber, butadiene-acrylonitrile copolymer rubber, polybutadiene rubber, polyisoprene rubber, isoprene-isobutylene copolymer rubber, polychloroprene rubber and the like.

In reinforcement of a rubbery article with a fibrous material, a sufficient adhesion between the rubber and the fibrous material is required to endure a periodic large deformation subjected to rubbery articles in the use.

Polyester fibers have high tensile strength and modulus, and excellent heat resistance and water proof and therefore, they are one of the most preferable fibers for reinforcing rubber, but they are difficult in adhesion to the other substances and consequently, various adhering processes have been previously proposed.

A large number of embodiments using an epoxy compound for adhesion of a fibrous material with a rubber have been proposed and U.S. Pat. No. 2,902,398 is a typical process. However, these previous methods have some important defects in view of production of rubber articles.

Firstly, it is most preferable in view of safety and economy to use water as a medium of adhesive, but in the epoxy compounds disclosed in such a patent and the like, completely water soluble compounds are very few. Even if the water insoluble compounds are used by emulsifying and dispersing in water, there are problems in the colloidal stability and preserving property of the emulsion and further the cost increases for preparation of the emulsion, and therefore such compounds are much more inferior to water soluble compounds. Furthermore, an emulsifier is generally poisonous to the adhesion.

Secondary, there is a problem in heat stabiliy of epoxy compounds. When a fiber is immersed in a liquid adhesive containing an epoxy compound and dried, an improved adhesion cannot be obtained, unless the temperatures for the drying and the heat treatment are higher than 200° C., and preferably higher than 220° C. Accordingly, if the used epoxy compound, when exposing to such a high temperature, is thermally decomposed and evaporated, a large drawback occurs in safety and economy.

Thirdly, there is a problem in decrease of adhesion under a high temperature condition.

Recently the conditions in use of rubbery articles have been more severe and a decrease of the adhesion power at an elevated temperature, for example, higher than 100° C. is an important problem. Therefore, an epoxy compound having a high adhesion power at normal temperature and at an elevated temperature is demanded. Any prior arts including the above described patent have not disclosed epoxy compounds completely satisfying the above described three requirements.

The inventors have made various investigations with respect to the above described points and discovered that an epoxy compound containing epoxy group, which is a reaction product of isocyanuric acid and epichlorohydrin, satisfies completely the above described requirements.

Isocyanuric acid and epichlorohydrin can produce an epoxy compound, namely, triglycidyl isocyanurate.

In general, isocyanuric acid derivatives have keto type and enol type isomers and isocyanuric acid and epichlorohydrin can provide keto type glycidyl isocyanurate and enol type glycidyl cyanurate having the general formulae according to the reaction condition.

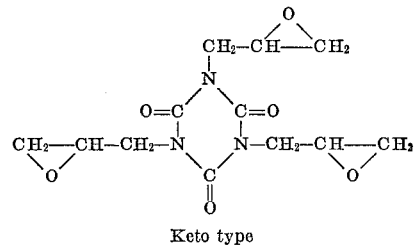

Keto type

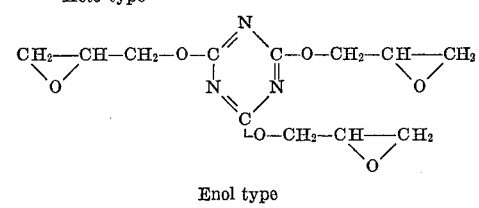

Enol type

However, at a high temperature of about 220° C., the enol type converts into the keto type and therefore, in order to avoid troublesome hereinafter in the explanation, the reaction products of isocyanuric acid and epichlorohydrin are referred to as only "triglycidyl isocyanurate."

For a better understanding of the invention, reference is taken to the accompanying drawing, wherein a single figure shows curves for comparing heat resistance of an epoxy compound to be used in the present invention with heat resistance of epoxy compounds to be used in the conventional adhering process.

About 5 g. of the epoxy compound is dissolved in 100 g. of water at 25° C. The heat resistance of this compound is very excellent and this point will be explained hereinafter in detail. In general, in order to test heat resistance of a compound, a process using a thermobalance is the most excellent means.

The curve 1 in the attached drawing shows a result obtained by measuring weight decrease of water soluble diglycidyl glycerol having the following formula, which has been used in a conventional adhering process, by a thermobalance when the temperature is increased

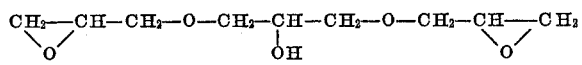

and the curve 2 shows weight decrease of water soluble diglycidyl polyethyleneglycol having the following formula, which has been used in a conventional adhering process

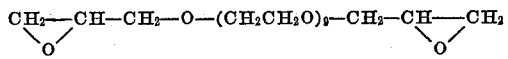

Accordingly, it can be easily understood that these epoxy compounds have an important drawback in view of the heat resistance.

The curve 3 in the drawing shows weight decrease of triglycidyl isocyanurate to be used in the present invention. From this, it can be seen that triglycidyl isocyanurate is extremely superior to the former two compounds in the heat resistance.

Next, the fact that the adhering process of the present invention is particularly superior to the other processes in the adhesive power when heated at a high temperature, will be mentioned in examples described hereinafter and presumably this is due to the fact that the compound according to the present invention has a heterocyclic structure which is stable and is a polyfunctional compound.

The process of the present invention comprises immersing a polyester fibrous material into a first bath consisting mainly of triglycidyl isocyanurate, drying and heat treating the immersed polyester fibrous material, further immersing such polyester fibrous material into a second bath containing a resorcin-formaldehyde resin and a rubber latex and drying the immersed fibrous material and then contacting the thus treated fibrous material with a vulcanizable rubber composition and vulcanizing the rubber.

For the above described first bath according to the present invention, an aqueous solution of triglycidyl isocyanurate is used alone and a good result can be obtained.

Furthermore, the same good result can be obtained by using triglycidyl isocyanurate as the first component together with a compound having a hardening function against triglycidyl isocyanurate as a second component.

This second component includes amines, amine derivatives, polybasic carboxylic acids and polybasic carboxylic acid anhydrides.

As the amines, mention may be made of aliphatic, aromatic, heterocyclic compounds, such as ethylenediamine, hexamethylenediamine, diethylenetriamine, triethylenetetramine, dipropylenetriamine, dimethylaminopropylamine, diethylaminopropylamine, cyclohexylaminopropylamine, monoethanolamine, N(2 - hydroxypropyl) ethylenediamine, propanolamine, meta-phenylenediamine, p,p'-diaminodiphenylmethane, diaminodiphenylsulfon, meta-xylenediamine, melamine, dicyandiamine, etc., and the other primary amines, the secondary amines, such as N,N-dibutyl-1,3-propanediamine, N,N-diethyl-1,3-propandiamine, aminoethylethanolamine, monohydroxyethyldiethylenetriamine, bis-hydroxyethyldiethylenetriamine, etc., and the tertiary amines, such as, benzyldimethylamine, α-methyldimethylamine, dimethylaminomethylphenol, tridimethylaminomethylbenzene, etc.

The amine derivatives used herein mean substituted compounds, in which active hydrogens of the above described polyamines are partially substituted with an electrophilic reagent, for example, reaction products of the above described polyamine with a glycidyl compound, such as, butyl glycidyl ether, a vinyl compound, such as, acrylonitrile, acrylamide, an acid halide, such as, acetyl chloride, an acid anhydride, such as, acetic anhydride or a halogenated hydrocarbon.

The above described reactions can be shown by the following formulae:

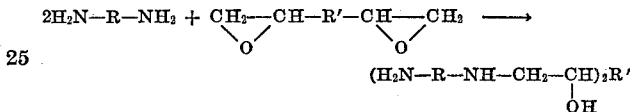

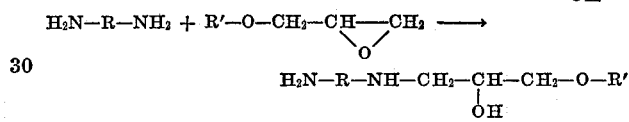

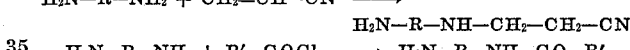

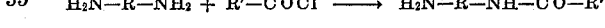

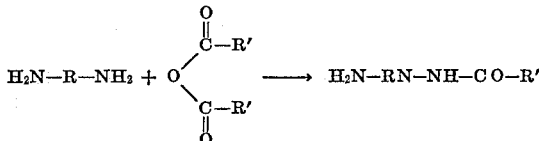

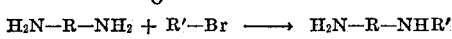

In the above formulae, R and R' show hydrocarbon residues.

Polybasic carboxylic acids and the acid anhydrides thereof include, for example, phthalic acid, maleic acid oxalic acid, hexahydrophthalic acid, methyl-endo-methylenephthalic acid, 3,6-endo-methylene-1,2,3,6-tetrahydro-cis-phthalic acid, pyromellitic acid, hexachloro-endo-methylenetetrahydrophthalic anhydride, dichloromaleic acid and acid anhydrides thereof. At least one of these substances can be used as the second component. The most effective second components in the present invention are amines containing spiro-acetal ring or the derivatives thereof. They are 3,9-bis(aminoalkyl)-2,4,8,10-tetroxaspiro(5.5)undecanes, which are shown by the general formula having the following skeletal structure:

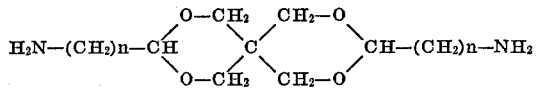

In the above formula, $n$ is an integer of 1 to 12.

The reason why in the present invention, these amines show more excellent activity than the above described amino compounds, has not been clarified yet, but presumably, such an activity will be brought about from increase of heat resistance due to similarity of structure between spiroacetal ring and triethylene terephthalate and the cyclic structure.

However, if the amines are used as the second component, they react with triglycidyl isocyanurate in an aqueous solution at room temperature to form a water insoluble polymer and therefore, the usable time (pot life) is limited and the amines are not preferable.

Accordingly, in order to improve this point, it is preferable in the present invention to use substances referred to as amine regenerators or amine block derivatives which regenerate amines at a high temperature and in this case the usable time is not limited, so that these substances are very preferable. The amine regenerators are a reaction product of an amine with formaldehyde and a reaction product of an amine with carbon dioxide, that is, an aminocarbamate. According to the present invention, the aminocarbamate is most preferable and it regenerates an amine at a temperature higher than about 70° C. An embodiment is hexamethylene diaminocarbamate, which is shown by the formula

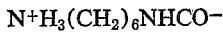

The heat treating temperature after a polyester fiber is immersed into the first bath is not disclosed in the above described U.S. patent and in the examples the heat treatment is effected at a relatively low temperature of about 140° C. However, the temperature condition of the heat treatment is very important in the practice of the present invention. Namely, according to the method of the present invention a good result can be obtained at a temperature higher than 200° C., preferably, higher than 220° C., more particularly, 230 to 250° C. That is, it is absolutely necessary to effect a heat treatment at a temperature of 200 to 250° C. at least once after the treatment of the first bath. Because, the component of the liquid adhesive to be used in the present invention can be dispersed into polyester fiber only at an elevated temperature of higher than 200° C. and temperature of the heat treatment at lower than 200° C. cannot provide a good adhesion power. Accordingly, as the temperature of the heat treatment is higher, the better result can be obtained, while at a temperature higher than 251° C., polyester fiber is softened, deteriorated and decreased in strength, so that the treatment at such a temperature cannot be carried out or gives unfavorable results. As a preliminary step before this heat treatment at the high temperature, a drying or a heat treatment at a temperature lower than 200° C. may be effected.

The temperature of heat treatment after immersed in the second bath is 100 to 250° C., preferably, higher than 200° C., more particularly, 230 to 250° C. Such a treatment may be effected at a step from spinning of polyester fiber to twisting or weaving, alternatively, in a step after the weaving. Furthermore, it is not always necessary to effect the second bath treatment immediately after the first bath treatment and it is possible to insert another step, for example, twisting, weaving and the like between the first bath treatment and the second bath treatment.

An amount of the component of adhesive picked up on the fiber in the first bath is preferably 0.01 to 15.0 parts by weight based on 100 parts by weight of fiber, more preferably, 0.50 to 5.0 parts by weight. When such an amount is less than 0.01 part by weight, the adhesive effect cannot be attained, while if such an amount is more than 15.0 parts by weight, an increase of adhesion power is no longer attained and the treated fibers are extremely stiffened and therefore, such amounts are not preferable.

An amount of the component in the second bath picked up, based on the same reason as described above, is preferably 0.10 to 15.0 parts by weight based on 100 parts by weight of fiber, more preferably, 1.0 to 7.0 parts. Accordingly, the concentration of the liquid adhesive may be varied properly, so that such an amount is within the above described range, depending upon the immersing and coating process and the treating apparatus.

When the adhesive of the first bath is composed of the above described two components, an amount of the second component varies depending upon the molecular weight and the number of functional groups per molecule, but is generally 1 to 300 parts by weight, preferably, 5 to 70 parts by weight, more particularly, 20 to 60 parts by weight based on 100 parts by weight of the first component of triglycidyl isocyanurate. If the amount of the second component is less than 1 part by weight, there appears substantially no effect of the addition, while when such an amount exceeds 300 parts by weight, a reverse effect appears and such amounts are not preferable.

Then an explanation will be made with respect to the second bath. The second bath is composed of a preliminary condensate of a resorcin-formaldehyde resin and a rubber latex. The molar ratio of reaction of resorcin and formaldehyde can be selected from 1:0.2 to 1:7, preferably, from 1:1 to 1:3. The ratio of rubber latex solid to resorcin-formaldehyde resin can be selected from 100:1 to 100:35, preferably, from 100:10 to 100:25. For a catalyst of condensation of resorcin and formaldehyde, basic substances, for example, alkali metal hydroxides, such as sodium hydroxide, potassium hydroxide and the like or amines, such as, ammonium, ethylamine, piperazine, urea, thiourea, etc., can be used. These substances may be used in such an amount that pH of the liquid adhesive is 7.5 to 11.0, preferably, 8.5 to 10.5. If the second bath exceeds the above described limited conditions, a good adhesive effect cannot be obtained, so that such conditions are not preferable.

As the rubber latexes, use may be made of natural rubber latex and synthetic rubber latexes, such as, styrene-butadiene-vinylpyridine copolymeric rubber latex, but the kind of rubber latex is determined depending upon the rubber to be adhered. In general, when the rubbers to be adhered are ordinarily used rubbers, such as, natural rubber, styrene-butadiene copolymeric rubber, polybutadiene rubber, polyisoprene rubber and the like, at least one of the above described rubber latexes may be used.

The invention will be explained in detail by the following examples which are not limitative of the scope of this invention. The "part" in the examples means by weight.

EXAMPLE 1

Polyethylene terephthalate tire cord (structure of twist: 1100 D/3, numbers of ply twist: 43 turns/10 cm., numbers of cable twist: 43 turns/10 cm.) was immersed into a first bath composed of 5% aqueous solution of triglycidyl isocyanurate and then subjected to a heat treatment under air atmosphere kept at 235° C. for 1 minute, and then immersed into a second bath having the following composition and further subjected to a heat treatment under air atmosphere kept at 235° C. for 1 minute to obtain a treated cord. The thus treated cord was embedded in a vulcanizable rubber and subjected to a vulcanization. In this case, a length of 0.6 cm. of the treated cord was linear state and has been adhered with the rubber and a power necessary for pulling out the cord from the rubber mass was referred to as the adhesion power. The pulling out test was effected under an atmosphere kept at 120° C. and as the result, the adhesion power was 13.2 kg.

The second bath had the following composition:

| | |
|---|---|
| Water | 238.4 |
| Caustic soda | 0.3 |
| Resorcin | 11.0 |
| 37% formaldehyde | 16.2 |
| JSR0650 [1] | 244.0 |

[1] Vinylpyridine-styrene-butadiene copolymeric rubber latex sold by Nippon Gosei Gomu K.K. under the trademark "JSR0650," solids content: 41%.

This liquid was left to stand for 16 hours to form a preliminary condensate of resorcin-formaldehyde resin, which was used.

The rubber composition to be adhered had the following recipe:

| | |
|---|---:|
| Natural rubber | 90 |
| Styrene-butadiene copolymeric rubber | 10 |
| Carbon black | 40 |
| Stearic acid | 2 |
| Petroleum softener | 10 |
| Pine tar | 4 |
| Zinc white | 5 |
| N-phenyl-β-naphthylamine | 1.5 |
| 2-benzothiazolydisulfide | 0.75 |
| Diphenylguanidine | 0.75 |
| Sulfur | 2.5 |

Vulcanization condition 145° C., 30 min.

EXAMPLE 2

Example 1 was repeated, except that the first baths having a composition as shown in the following Table 1 were used. The adhesion powers are shown in Table 1.

TABLE 1

| Experimental No. | Composition of the first bath | Percent | Adhesion power (kg./0.6 cm.) |
|---|---|---:|---:|
| 1 | Triglycidyl isocyanurate<br>Water | 3<br>97 | 13.0 |
| 2 | Triglycidyl isocyanurate<br>Water | 1<br>99 | 12.9 |
| 3 | Triglycidyl isocyanurate<br>Water | 0.5<br>99.5 | 12.5 |
| 4 | Triglycidyl isocyanurate<br>Hexamethylenediaminocarbamate<br>Water | 4<br>1<br>95 | 14.0 |
| 5 | Triglycidyl isocyanurate<br>Hexamethylenediaminocarbamate<br>Water | 4<br>2<br>94 | 14.2 |
| 6 | Triglycidyl isocyanurate<br>Hexamethylenediaminocarbamate<br>Water | 2<br>0.5<br>97.5 | 14.3 |
| 7 | Triglycidyl isocyanurate<br>Ethylenediaminocarbamate<br>Water | 4<br>1<br>95 | 14.5 |
| 8 | Triglycidyl isocyanurate<br>Hexamethylenediamine butyl-glycidyl ether adduct<br>Water | 4<br>2<br>94 | 13.8 |
| 9 | Triglycidyl isocyanurate<br>N,N-dibutyl-1,3-propanediamine<br>Water | 4<br>2<br>94 | 13.5 |
| 10 | Triglycidyl isocyanurate<br>Hexahydrophthalic acid<br>Water | 4<br>1<br>95 | 13.7 |
| 11 | Triglycidyl isocyanurate<br>Maleic acid<br>Water | 4<br>1<br>95 | 12.9 |

EXAMPLE 3

Example 1 was repeated, except that the first baths having a composition as shown in the following Table 2 were used. The adhesion powers are shown in Table 2.

TABLE 2

| Experimental No. | Composition of the first bath | Percent | Adhesion power (kg./0.6 cm.) |
|---|---|---:|---:|
| 1 | Triglycidyl isocyanurate<br>3,9-bis(2-aminoethyl)-2,4,8,10-tetroxaspiro[5.5]undecane carbamate<br>Water | 4<br>1<br>95 | 15.2 |
| 2 | Triglycidyl isocyanurate<br>3,9-bis(3-aminopropyl)-2,4,8,10-tetroxaspiro[5.5]undecane-carbamate<br>Water | 4<br>1<br>95 | 15.5 |
| 3 | Triglycidyl isocyanurate<br>3,9-bis(3-aminopropyl)-2,4,8,10-tetroxaspiro[5.5]undecane-carbamate<br>Water | 3<br>1<br>96 | 15.8 |
| 4 | Triglycidyl isocyanurate<br>3,9-bis(3-aminopropyl)-2,4,8,10-tetroxaspiro[5.5] undecane carbamate<br>Water | 0.5<br>0.25<br>99.25 | 15.2 |
| 5 | Triglycidyl isocyanurate<br>3,9-bis(3-aminopropyl)-2,4,8,10-tetroxaspiro[5.5]undecanecarbamate<br>3,9-bis(3-aminopropyl)-2,4,8,10-tetroxaspiro[5.5]undecanebutyl-glycidyl ether adduct<br>Water | 4<br>1<br>1<br>94 | 16.1 |
| 6 | Liquid of No. 1 left to stand for 3 weeks after perparation. | — | 15.0 |

EXAMPLE 4

A raw yarn for polyethylene terephthalate tire cord composed of 150 filaments and having a fineness of 1,500 deniers was immersed into a first bath consisting of 0.4 part of triglycidyl isocyanurate, 0.1 part of 3,9-bis(3-aminopropyl) - 2,4,8,10 - tetroxaspiro[5.5]undecanecarbamate and 99.5 parts of water, and then heat-treated at 235° C. for 1 minute. Then three of the thus treated raw yarns were twisted in number of twist of cable twist of 43 T/10 cm. and ply twist of 43 T/10 cm. to produce a twisted yarn. The twisted yarn was immersed in the second bath as used in Example 1 and then heat-treated at 235° C. for 1 minute. When the adhesion power of the thus treated cord was measured, it was 15.9 kg.

EXAMPLE 5

A tire cord was treated in the same manner as described in Example 1, expect that after immersed into the first bath, the tire cord was dried under air atmosphere at 180° C. and further after immersed into the second bath, the tire cord was dried under air atmosphere at 180° C. The adhesion power was 8.5 kg. From this example and Example 1, it can be seen that the higher the drying temperature, the better the result is.

EXAMPLE 6

A tire cord was treated in the same manner as described in Example 1, except that the tire cord was dried under air atmosphere at 130° C. after immersed into the second bath. The adhesion power was 11.5 kg.

EXAMPLE 7

A tire cord was treated in the same manner as described in Example 1, except that the tire cord was dried under air atmosphere at 180° C. after immersed into the first bath. The adhesion power was 9.1 kg. From this example and Examples 1, 5 and 6, it can be seen that it is advantageous that the drying temperature after immersed into the first bath is higher.

Comparative example

In order to compare the method of the present invention with the conventional method, an experimental result of the adhesion power in the process of U.S. Pat. No. 2,902,398 will be shown.

(A) 100 parts of an epoxy compound derived from glycerol and epichlorohydrin (sold by Shell International Chemicals Corp. under the trademark "Epikote" 812) and 100 parts of 85% saponified polyvinyl acetate were mixed while stirring, and then water is added thereto to prepare 15% "Epikote" 812 solution. To this solution were added 25 parts of ethylenediamine to prepare a first bath. A polyethylene terephthalate tire cord of 1100 D/3 was immersed into the first bath and dried at 143° C. for 5 minutes. Then, this treated tire cord was immersed into the second bath described in Example 1 and dried at 143° C. for 5 minutes. When the adhesion power of the thus treated tire cord was measured, it was only 3.1 kg.

(B) A tire cord was treated in the same manner as described in the item A, except that both the heat treatments after immersed into the first bath and the second bath were effected at 235° C. for 1 minute. The adhesion power was 8.7 kg.

What is claimed is:

1. A process for adhering a polyester fibrous material to a rubber, which comprises forming an aqueous solution of triglycidyl isocyanurate, directly immersing a polyester fibrous material into said aqueous solution of triglycidyl isocyanurate as a first bath, drying the immersed polyester fibrous material at a temperature of 200° to 250° C., immersing the thus treated fibrous material into a second bath composed of an aqueous solution of a resorcin-formaldehyde resin and a rubber latex solution, drying the immersed fibrous material at a temperature of 100° to 250° C., embedding the thus treated fibrous material in a vulcanizable rubber composition and vulcanizing the rubber.

2. The process as claimed in claim 1, wherein the amount of triglycidyl isocyanurate of the first bath picked up on the fibrous material after the drying is 0.01 to 15.0 parts by weight based on 100 parts by weight of the fibrous material and an amount of the resorcin-formaldehyde resin and the rubber latex of the second bath picked up on the fibrous material after the drying is 0.10 to 15.0 parts by weight per 100 parts by weight of the fibrous material.

3. A process for adhering a polyester fibrous material to a rubber which comprises forming an aqueous solution of a first component of triglycidyl isocyanurate and a second component selected from the group consisting of amines, amine derivatives, amine regenerators of amines and amine regenerators of amine derivatives, the weight ratio of the first component to the second component being 100:1 to 100:300, directly immersing a polyester fibrous material in said aqueous solution as a first bath, drying the immersed fibrous material at a temperature of 200° to 250° C., immersing the thus treated fibrous material into a second bath composed of an aqueous solution of a resorcin-formaldehyde resin and a rubber latex solution, drying the immersed fibrous material at a temperature of 100° to 250° C., embedding the thus treated fibrous material in a vulcanizable rubber composition and then vulcanizing the rubber.

4. The process as claimed in claim 3, wherein the amount of the first and second components of the first bath picked up on the fibrous material after the drying is 0.01 to 15.0 parts by weight based on 100 parts by weight of the fibrous material and an amount of the resorcin-formaldehyde resin and the rubber latex of the second bath picked up on the fibrous material after the drying is 0.10 to 15.0 parts by weight per 100 parts by weight of the fibrous material.

5. The process as claimed in claim 3, wherein said amine derivative is a compound wherein active hydrogens of amino group in polyamines are partially substituted with electrophilic reagent selected from the group consisting of glycidyl compounds, vinyl compounds, acid halides and acid anhydrides.

6. The process as claimed in claim 3, wherein said amine is selected from the group consisting of aliphatic amines, aromatic amines and heterocyclic amines.

7. The process as claimed in claim 3, wherein said amine is selected from 3,9 - bis(aminoalkyl)-2,4,8,10-tetroxaspiro[5.5]undecanes of amines having spirocyclic structure.

8. The process as claimed in claim 3, wherein said amine regenerator is selected from the group consisting of a reaction product of an amine with formaldehyde and a reaction product of an amine with carbon dioxide.

9. A process for adhering a polyester fibrous material to a rubber which comprises forming an aqueous solution of a first component of triglycidyl isocyanurate and a second component selected from the group consisting of polybasic carboxylic acids and polybasic carboxylic acid anhydrides, the weight ratio of the first component to the second component being 100:1 to 100:300, directly immersing a polyester fibrous material into said aqueous solution as a first bath, drying the immersed fibrous material at a temperature of 200° to 250° C., immersing the thus treated fibrous material into a second bath composed of an aqueous solution of a resorcin-formaldehyde resin and a rubber latex solution, drying the immersed fibrous material at a temperature of 100° to 250° C., embedding the thus treated fibrous material in a vulcanizable rubber composition and then vulcanizing the rubber.

10. The process as claimed in claim 9, wherein the amount of the first and second components of the first bath picked up on the fibrous material after the drying is 0.01 to 15.0 parts by weight based on 100 parts by weight of the fibrous material and an amount of the resorcin-formaldehyde resin and the rubber latex of the second bath picked up on the fibrous material after the drying is 0.10 to 15.0 parts by weight per 100 parts by weight of the fibrous material.

11. The process as claimed in claim 9, wherein said polybasic carboxylic acid is selected from the group consisting of phthalic acid, maleic acid, oxalic acid, hexahydrophthalic acid, 3,6 - endo-methylene - 1,2,3,6-tetrahydro-cis-phthalic acid, pyromellitic acid, hexachloro-endo-methylene tetrahydrophthalic acid and dichloromaleic acid.

12. The process as claimed in claim 9, wherein said acid anhydride is selected from the group consisting of anhydrides of phthalic acid, maleic acid, oxalic acid, hexahydrophthalic acid, 3,6 - endo-methylene - 1,2,3,6-tetrahydro-cis-phthalic acid, pyromellitic acid, hexachloro-endo-methylene tetrahydrophthalic acid and dichloromaleic acid.

References Cited
UNITED STATES PATENTS

| | | | |
|---|---|---|---|
| 2,652,353 | 9/1953 | Wilson | 117—80 |
| 2,902,398 | 9/1959 | Schroeder | 117—80 X |
| 2,905,582 | 9/1959 | Coleman, Jr. et al. | 156—314 X |
| 3,108,029 | 10/1963 | Wohnsiedler et al. | 156—330 |
| 3,132,142 | 5/1964 | Hopkins | 156—330 |
| 3,240,649 | 3/1966 | Atwell | 156—315 |
| 3,272,676 | 9/1966 | Kigane et al. | 156—330 X |
| 3,278,333 | 10/1966 | Titzmann et al. | 117—80 X |
| 3,318,750 | 5/1967 | Aitken | 117—80 X |

CARL D. QUARFORTH, Primary Examiner

E. E. LEHMANN, Assistant Examiner

U.S. Cl. X.R.

117—80; 156—298, 314, 327, 330; 260—29.4